(12) United States Patent
Kuttenberger

(10) Patent No.: US 10,222,802 B2
(45) Date of Patent: Mar. 5, 2019

(54) METHOD AND DEVICE FOR ASSISTING A DRIVER

(71) Applicant: Robert Bosch GmbH, Stuttgart (DE)

(72) Inventor: Alfred Kuttenberger, Weil Der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 8 days.

(21) Appl. No.: 15/384,404

(22) Filed: Dec. 20, 2016

(65) Prior Publication Data

US 2017/0192433 A1 Jul. 6, 2017

(30) Foreign Application Priority Data

Dec. 30, 2015 (DE) .................... 10 2015 226 847

(51) Int. Cl.
*G05D 1/02* (2006.01)
*B62D 15/02* (2006.01)
*B62K 21/00* (2006.01)
*B62J 27/00* (2006.01)
*B62J 3/00* (2006.01)
*B62J 6/00* (2006.01)
*B62L 5/00* (2006.01)
*B62J 99/00* (2009.01)

(52) U.S. Cl.
CPC ....... *G05D 1/0214* (2013.01); *B62D 15/0265* (2013.01); *B62J 27/00* (2013.01); *G05D 1/0246* (2013.01); *B62D 15/025* (2013.01); *B62J 3/00* (2013.01); *B62J 6/00* (2013.01); *B62J 2099/0013* (2013.01); *B62K 21/00* (2013.01); *B62K 2207/02* (2013.01); *B62L 5/006* (2013.01)

(58) Field of Classification Search
None
See application file for complete search history.

(56) References Cited

U.S. PATENT DOCUMENTS

| 9,916,508 | B2* | 3/2018 | Pillai | G06K 9/00791 |
|---|---|---|---|---|
| 2013/0311075 | A1 | 11/2013 | Tran et al. | |
| 2015/0178573 | A1* | 6/2015 | Viswanath | G06K 9/00798 382/103 |
| 2016/0267331 | A1* | 9/2016 | Pillai | G06K 9/00791 |
| 2017/0151850 | A1* | 6/2017 | Deigmoller | B60G 17/0165 |

* cited by examiner

*Primary Examiner* — Lail A Kleinman
(74) *Attorney, Agent, or Firm* — Norton Rose Fulbright US LLP; Gerard Messina

(57) ABSTRACT

A method for assisting a driver of a two-wheeled vehicle. The method includes sensing and evaluating a driving environment of the motorcycle as a function of a driving state of the motorcycle, especially an inclination of the motorcycle, in order to detect objects in the driving environment; determining a hazard potential as a function of the detected objects and the driving state; and warning the driver and/or triggering a driver assistance system and/or a vehicle safety system of the motorcycle as a function of the determined hazard potential.

18 Claims, 1 Drawing Sheet

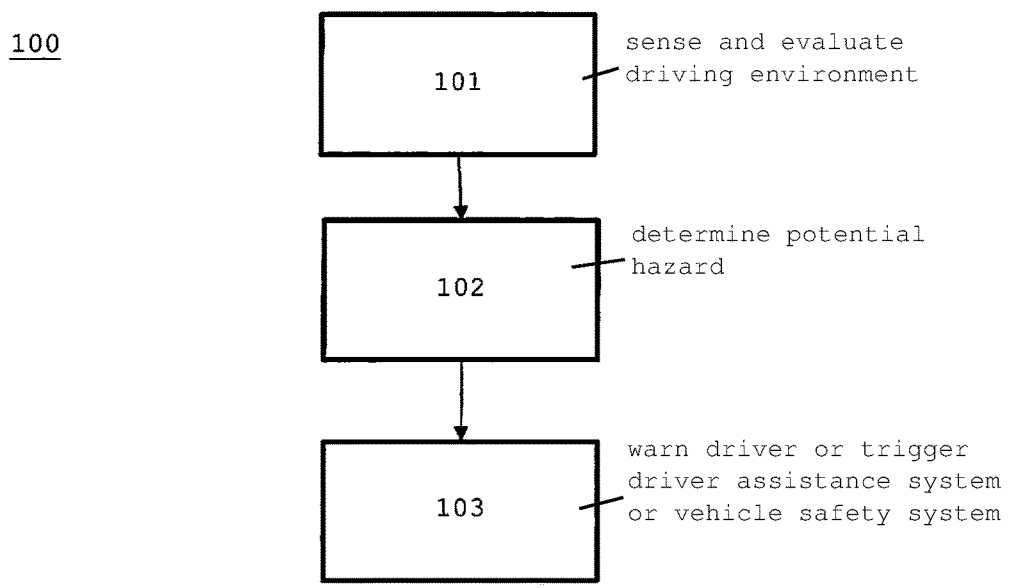

METHOD AND DEVICE FOR ASSISTING A DRIVER

CROSS REFERENCE

The present application claims the benefit under 35 U.S.C. § 119 of German Patent No. DE 102015226847.0 filed on Dec. 30, 2015, which is expressly incorporated herein by reference in its entirety.

FIELD

The present invention relates to a method and a device for assisting a driver, especially a driver of a two-wheeled vehicle, for example, a motorcycle.

BACKGROUND INFORMATION

Various systems are available chiefly for passenger cars, which detect vehicles in the blind spot of an automobile and indicate this in the mirror, for instance, or output an acoustic warning.

These systems are based on ultrasonic or radar systems, for example.

Owing to the helmet, motorcyclists have a limited field of view to the side and to the rear. Because of this, there is great danger of failing to notice a vehicle when changing lanes. Moreover, owing to the driving noise, it is noisy under the helmet, so that acoustic awareness of the vehicles to the side is also limited.

U.S. Patent Application Pub. No. 2013/0311075 A1 describes a safety system for motorcycles, this safety system including at least one sensor that is mounted on the motorcycle and senses features in the area surrounding the vehicle. In addition, an electronic control unit is implemented in such a way that the control unit receives a signal from the at least one sensor and, as a function of the at least one feature, determines the likelihood that a circumstance critical with regard to safety could occur. The determined likelihood is then compared to at least a first threshold value, and the electronic control unit is designed in such a way that at least one warning signal is output if the at least one feature lies above the first threshold value. For example, the warning signal may then be indicated in a helmet. In this context, the safety system may be one of the following systems: a blind-spot system, a crash warning system, a crossing-traffic warning system, a lane-departure warning system or a traffic-sign recognition system.

SUMMARY

The present invention provides a method and a device for assisting a driver of a two-wheeled vehicle, e.g., a motorcycle according to the independent claims of the present invention. Using the method and device, vehicles in the blind spot of the vehicle are detected with the aid of driving-environment sensors, and this is indicated to the driver. In so doing, a display in the mirror of the vehicle may be selected or, more advantageous, with the aid of a communication interface, the information is transmitted into the helmet and displayed there, or an acoustic warning signal is output.

For example, such a communication interface may be realized with the aid of a Bluetooth module.

In the case of two-wheeled vehicles like motorcycles, for instance, it is necessary to take into account the characteristic feature that they have different driving dynamics, especially an inclination or banking.

In the present case, as a crucial feature, especially for two-wheeled vehicles like motorcycles, for example, it is necessary to take into consideration that the motorcycle tilts to the side during cornering. Unlike for multitrack vehicles like passenger cars or automobiles, this requires a method that recognizes this special situation and allows for it in the evaluation, so that during banking, the road is not falsely detected as a vehicle in the blind spot.

Thus, a video system for blind-spot detection may include a method which evaluates the horizon on the basis of image information of the video system, and therefore ascertains the inclination angle of the motorcycle.

The inclination angle is subsequently taken into account in the evaluation of the driving environment with respect to vehicles in the driving environment of the two-wheeled vehicle, so that the trajectories of these vehicles may be calculated more precisely and an improved warning may be output to the driver, or driver assistance systems or vehicle safety systems may be triggered accordingly.

Thus, the method of the present invention includes the following steps:

Sensing and evaluating a driving environment of the two-wheeled vehicle as a function of a driving state of the two-wheeled vehicle in order to detect objects in the driving environment;

Determining a hazard potential as a function of the detected objects and the driving state;

Warning the driver and/or triggering a driver assistance system and/or a vehicle safety system of the motorcycle as a function of the determined hazard potential.

In the present case, a two-wheeled vehicle is understood in particular to be a motorcycle or motor scooter. In general, it is understood to be a vehicle where the edges lie in one track in relation to the direction of travel.

In addition, the method is also applicable to vehicles which, because of their construction or style of driving, experience a strong tilt or banking. For example, motorized three-wheelers or perhaps micro vehicles fall under this category.

In particular, a driving state in the present case is understood to be the inclination of the two-wheeled vehicle. The inclination of a motorcycle is also referred to as banking.

Hazard potential in the present case is understood to mean, among other things, that there is increased probability that the two-wheeled vehicle will collide with the detected object, in particular, with the detected vehicle. For example, this is the case when the trajectory of the detected object or of the detected other vehicle coincides with the planned or foreseeable trajectory of the two-wheeled vehicle.

In the present case, a driver assistance system is understood to be a system that assists the driver in executing his driving task. In so doing, the assistance may be effected in the output of warnings or warning signs, for example, by the triggering of warning lights. In another form, the assistance may be accomplished by interventions in the longitudinal guidance or lateral guidance by way of braking interventions or steering interventions, for example. Such a system is also known as ESP system or, for two-wheeled vehicles, as motorcycle ESP system. In addition, the assistance may be effected in the partial or complete takeover of the driving task with the aid of systems for automated driving.

A vehicle safety system in the present case is understood to be a system which is capable of improving the safety of the driver, the vehicle passenger or the other road users.

Among other things, braking systems or personal protection systems such as airbag systems, for example, fall under this category.

According to one specific embodiment of the method of the present invention, the inclination of the two-wheeled vehicle is determined as a function of image information of an image acquisition system disposed on the two-wheeled vehicle. To that end, horizontal structures are ascertained in the image information, and the ascertained horizontal structures are combined to form a horizon line. In addition, the horizontal structures ascertained in the image information are tracked, and a rotation of the horizon line is determined from detected rotations of the tracked horizontal structures. The roll rate of the two-wheeled vehicle may be derived from the ascertained rotation of the horizon line. From the roll rate, according to known principles, it is then possible to determine the inclination of the two-wheeled vehicle, thus, the banking of the motorcycle. Consequently, the ascertained rotation of the horizon line represents the inclination of the two-wheeled vehicle.

These horizontal structures are chiefly horizontal lines, for example, a horizon line or horizontal lines of an object, for instance, of another vehicle or other objects, e.g., buildings. Advantageously, the image information comes from an image acquisition system that is used to monitor the area surrounding the two-wheeled vehicle, in particular, to monitor the blind spot of the two-wheeled vehicle.

As an alternative to determining the inclination via an image acquisition system, this information, such as the inclination of the two-wheeled vehicle, may be retrieved from a sensor box, and thus lead to an improved interpretation of the driving environment.

In the present case, a sensor box is understood to be a device of the vehicle that has a variety of sensors and makes the sensor values of these sensors available to further vehicle systems.

For the case when a system for steering assistance or a steering damper is available, it is able to detect the steering-wheel angle or steering angle with the aid of an interface. From this information in combination with a speed signal, the inclination angle, and consequently the inclination of the two-wheeled vehicle or banking of the motorcycle may then likewise be determined and used as driving state in the method of the present invention.

Alternatively, the inclination angle or the driving state of the motorcycle may be ascertained from a forward-directed driver assistance system (e.g., video camera for determining an emergency-braking situation or sign recognition) and taken into account in the method according to the present invention as driving state of the two-wheeled vehicle.

According to one extension of this method, vertical structures are ascertained in the image information. The ascertained horizontal structures are then confirmed by the ascertained vertical structures.

These vertical structures may likewise stem from objects such as vehicles or buildings, for example.

Alternatively, the vertical structures ascertained in the image information may be taken directly into account in the combining of the horizontal structures to form the horizon line.

According to a development of one specific embodiment of the method of the present invention, lines of the road course are detected. The horizon line is determined from the detected lines of the road course.

According to one special variant, the vanishing point is determined from the lines of the road course.

This variant is based on the knowledge that the lines of the road course lead to a vanishing point. This vanishing point typically lies on the horizon line. Thus, the horizon line may be determined especially easily according to this variant of the method of the present invention.

In the present case, lines of the road course are understood, first of all, to be detected road markings. Secondly, methods are known which detect the traffic lanes, as well as the roadway edges or sides of the roadway. They are represented in the corresponding methods as line segments or, in the broadest sense, as lines. This variant of the method of the present invention is based on these lines, the ascertained line segments and the detected road markings.

According to one development of a specific embodiment of the method of the present invention, in the determination step, trajectories of the detected objects are ascertained. The hazard potential of the objects is determined as a function of the ascertained trajectories, the inclination being taken into account for ascertaining the trajectory.

According to one variant of this specific embodiment, the trajectories are determined as a function of the prediction of the inclination of the two-wheeled vehicle.

This has the advantage that the trajectories are determined more precisely, since the future estimated (predicted) change in the inclination or banking of the two-wheeled vehicle has some influence in the ascertainment of the trajectories.

According to the above, the information about the driving state of the two-wheeled vehicle or the inclination, thus, the banking of the motorcycle is taken into account in a method for assisting the driver of the two-wheeled vehicle, in particular, in a method for monitoring the blind spot of the two-wheeled vehicle.

In the same way, the aspect of the method with regard to determining the inclination of the two-wheeled vehicle or of the motorcycle may also be used for other sensor systems for monitoring the driving environment of the two-wheeled vehicle, such as ultrasonic, radar or lidar systems, in order to improve the evaluation of the driving environment of the two-wheeled vehicle.

A further aspect of the present invention is a computer program which is equipped to carry out all steps of a specific embodiment of the method of the present invention.

Another aspect of the present invention is a machine-readable storage medium on which such a computer program is stored.

A further aspect of the present invention is a device which is equipped to carry out all steps of a specific embodiment of the method of the present invention.

In the following, specific embodiments of the present invention are also illustrated and explained on the basis of FIGURE.

BRIEF DESCRIPTION OF THE DRAWING

FIG. 1 shows a flowchart of one specific embodiment of the method of the present invention.

DETAILED DESCRIPTION OF EXAMPLE EMBODIMENTS

FIG. 1 shows a flowchart of a specific embodiment of the method of the present invention.

In step 101, the driving environment of the two-wheeled vehicle is sensed and evaluated. In so doing, the driving state of the two-wheeled vehicle, especially the inclination of the two-wheeled vehicle, is taken into consideration.

Hereinafter, starting from an image acquisition system or a video sensor, the method is described by way of example in practical application on a motorcycle.

For instance, an algorithm according to the present method may be implemented on a device of the image acquisition system, e.g., on the control unit of the video system, the algorithm determining the banking of the motorcycle based on the image information.

According to one preferred specific embodiment, in the rear section or in the region of the mirror of the two-wheeled vehicle, a sensor system is mounted which monitors the area to the side and/or to the rear of the motorcycle and is suited to detect objects in this area.

This sensor system may be the image acquisition system just described. However, it may also be a separate system based on a different technology described at the outset.

To that end, the video image is analyzed and checked for structures which have "horizontal" structures or lines in the image. For example, these lines are a horizon line, horizontal lines of an object, e.g., of another vehicle or other objects, for instance, buildings. The algorithm searches for such structures in purposeful manner, aggregates them, and from them, determines the horizon line.

In a further step, the road course is determined, for example, with the aid of an algorithm for the detection of lines. The course of the road lines may likewise be utilized as input for the algorithm for determining the horizon line.

In so doing, the fact may be utilized that the road lines have their vanishing point in the horizon line. This may be used as starting point for the algorithm, since as a rule, the motorcyclist is setting off when the motorcycle is upright.

In a further step, it is examined how these lines change in the course of time and rotate in the image of the camera. Depending on the rotations, the ascertained or virtual horizon line is tracked correspondingly.

From the tracking of the horizon line, a roll rate of the motorcycle may be determined, and finally, the inclination or banking of the motorcycle during cornering may be ascertained.

In the case of extreme driving maneuvers, the inclination may be up to approximately 50°.

If the banking of the motorcycle is now determined with the aid of the procedure indicated above, then in a next step, the objects or vehicles are determined which are located on the roadway and are approaching the motorcycle or moving away from the motorcycle. In doing this, it is taken into account that the object lines are inclined by the banking angle, and thus lines "inclined" in this way must also be sought for new objects.

The inclination or the banking of the motorcycle must also be considered in the trajectory calculation and prediction.

In step 102, the hazard potential is determined based on the ascertained objects and in due consideration of the driving state of the two-wheeled vehicle or the inclination of the motorcycle.

Thus, by the consideration also of extreme bankings, it is possible to determine whether or not the object is becoming critical for the motorcyclist.

If another vehicle draws closer and enters into the blind spot of the two-wheeled vehicle, this is detected.

In step 103, the driver is warned, or driver assistance systems or vehicle safety systems are triggered as a function of the ascertained hazard potential.

For example, if a vehicle to the side of the two-wheeled vehicle is detected, then a display is activated on the motorcycle, e.g., in the mirror.

If a suitable helmet is available and if it is equipped with a connection interface, e.g., Bluetooth, then an acoustic or visual warning is transmitted to the helmet, for example, via an interface integrated in the blind-spot system or in the motorcycle, and in this way, the vehicle in the blind spot is indicated to the driver of the motorcycle.

What is claimed is:

1. A method for assisting a driver of a two-wheeled vehicle, which is a motorcycle, comprising:
    sensing and evaluating a driving environment of the motorcycle as a function of a driving state of the motorcycle to detect an object in the driving environment, the driving state including an inclination of the motorcycle;
    determining a hazard potential as a function of the detected object and the driving state; and
    at least one of: i) warning the driver as a function of the determined hazard potential, and ii) triggering a driver assistance system and/or a vehicle safety system of the motorcycle as a function of the determined hazard potential;
    wherein in the determining, trajectories of the detected objects are ascertained, and the hazard potential of the objects is determined as a function of the ascertained trajectories, a prediction of the inclination being taken into account for ascertaining the trajectory.

2. The method as recited in claim 1, wherein the inclination of the motorcycle is determined as a function of image information of an image acquisition system disposed on the motorcycle, structures having at least one horizontal line being ascertained in the image information, and the ascertained structures being combined to form a horizon line, the structures ascertained in the image information being tracked, and a rotation of the horizon line being determined from detected rotations of the structures, the rotation of the horizon line representing the inclination of the motorcycle.

3. The method as recited in claim 2, wherein other structures having at least one vertical line are ascertained in the image information, the ascertained structures being confirmed by the ascertained other structures.

4. The method as recited in claim 2, wherein other structures having at least one vertical line are ascertained in the image information, the ascertained other structures being taken into account in the combining of the structures to form the horizon line.

5. The method as recited in claim 2, wherein lines of the road course are detected, and the horizon line is determined from the detected lines of the road course, a vanishing point being determined from the lines of the road course.

6. The method as recited in claim 1, wherein in the sensing and evaluating, objects are detected based on lines of the objects, the lines of the objects being determined as a function of the inclination.

7. A non-transitory machine-readable storage medium on which is stored a computer program, which is executable by a processor, comprising:
    a program code arrangement having program code for assisting a driver of a two-wheeled vehicle, which is a motorcycle, by performing the following:
        sensing and evaluating a driving environment of the motorcycle as a function of a driving state of the motorcycle to detect an object in the driving environment, the driving state including an inclination of the motorcycle;
        determining a hazard potential as a function of the detected object and the driving state; and at least one of: i) warning the driver as a function of the determined hazard potential, and ii) triggering a driver assistance system and/or a vehicle safety system of the motorcycle as a function of the determined hazard potential;
wherein in the determining, trajectories of the detected objects are ascertained, and the hazard potential of the objects is determined as a function of the ascertained trajectories, a prediction of the inclination being taken into account for ascertaining the trajectory.

8. A device for assisting a driver of a two-wheeled vehicle, which is a motorcycle, comprising:
an assistance unit configured to perform the following:
sense and evaluate a driving environment of the motorcycle as a function of a driving state of the motorcycle to detect an object in the driving environment, the driving state including an inclination of the motorcycle;
determine a hazard potential as a function of the detected object and the driving state; and
at least one of: i) warning the driver as a function of the determined hazard potential, and ii) triggering a driver assistance system and/or a vehicle safety system of the motorcycle as a function of the determined hazard potential;
wherein in the determining, trajectories of the detected objects are ascertained, and the hazard potential of the objects is determined as a function of the ascertained trajectories, a prediction of the inclination being taken into account for ascertaining the trajectory.

9. The device as recited in claim 8, wherein the inclination of the motorcycle is determined as a function of image information of an image acquisition system disposed on the motorcycle, structures having at least one horizontal line being ascertained in the image information, and the ascertained structures being combined to form a horizon line, the structures ascertained in the image information being tracked, and a rotation of the horizon line being determined from detected rotations of the structures, the rotation of the horizon line representing the inclination of the motorcycle.

10. The device as recited in claim 9, wherein other structures having at least one vertical line are ascertained in the image information, the ascertained structures being confirmed by the ascertained other structures.

11. The device as recited in claim 9, wherein other structures having at least one vertical line are ascertained in the image information, the ascertained other structures being taken into account in the combining of the structures to form the horizon line.

12. The device as recited in claim 9, wherein lines of the road course are detected, and the horizon line is determined from the detected lines of the road course, a vanishing point being determined from the lines of the road course.

13. The device as recited in claim 8, wherein in the sensing and evaluating, objects are detected based on lines of the objects, the lines of the objects being determined as a function of the inclination.

14. The storage medium as recited in claim 7, wherein the inclination of the motorcycle is determined as a function of image information of an image acquisition system disposed on the motorcycle, structures having at least one horizontal line being ascertained in the image information, and the ascertained structures being combined to form a horizon line, the structures ascertained in the image information being tracked, and a rotation of the horizon line being determined from detected rotations of the structures, the rotation of the horizon line representing the inclination of the motorcycle.

15. The storage medium as recited in claim 14, wherein other structures having at least one vertical line are ascertained in the image information, the ascertained structures being confirmed by the ascertained other structures.

16. The storage medium as recited in claim 14, wherein other structures having at least one vertical line are ascertained in the image information, the ascertained other structures being taken into account in the combining of the structures to form the horizon line.

17. The storage medium as recited in claim 14, wherein lines of the road course are detected, and the horizon line is determined from the detected lines of the road course, a vanishing point being determined from the lines of the road course.

18. The storage medium as recited in claim 7, wherein in the sensing and evaluating, objects are detected based on lines of the objects, the lines of the objects being determined as a function of the inclination.

* * * * *